J. C. NOBLE.
KITCHEN UTENSILS.

No. 170,888.  Patented Dec. 7, 1875.

ATTEST:  
Jas. T. Smith  
J. K. Ingalls

INVENTOR:  
John C. Noble  
Per Burke & Fraser  
Attys.

UNITED STATES PATENT OFFICE.

JOHN C. NOBLE, OF BROOKLYN, NEW YORK, ASSIGNOR TO HIMSELF AND MARY LOVELAND, OF SAME PLACE.

IMPROVEMENT IN KITCHEN UTENSILS.

Specification forming part of Letters Patent No. 170,888, dated December 7, 1875; application filed November 2, 1875.

*To all whom it may concern:*

Be it known that I, JOHN C. NOBLE, of Brooklyn, in the county of Kings and State of New York, have invented certain Improvements in a Combination Kitchen Utensil, of which the following is a specification:

The object of this invention is to combine, in one cheap and convenient utensil for kitchen use, several devices for accomplishing as many different and useful purposes, each device being designed to assist, and not interfere with, the operation of the others, thus each, to a greater or less degree, accomplishing more than one result.

The invention consists in the construction and arrangement of the several devices, and their combinations with each other, as will be hereinafter shown.

Figure 1:
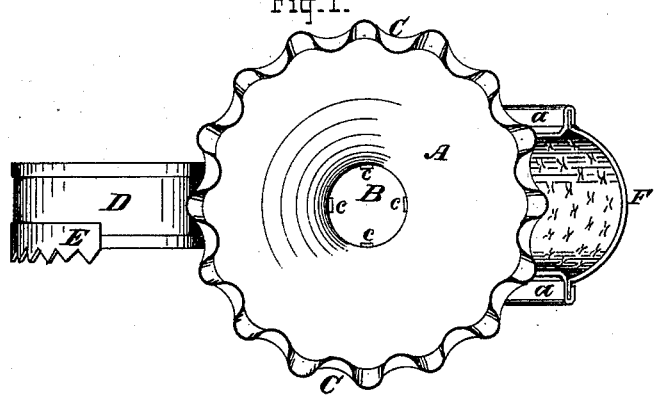
Figure 2:
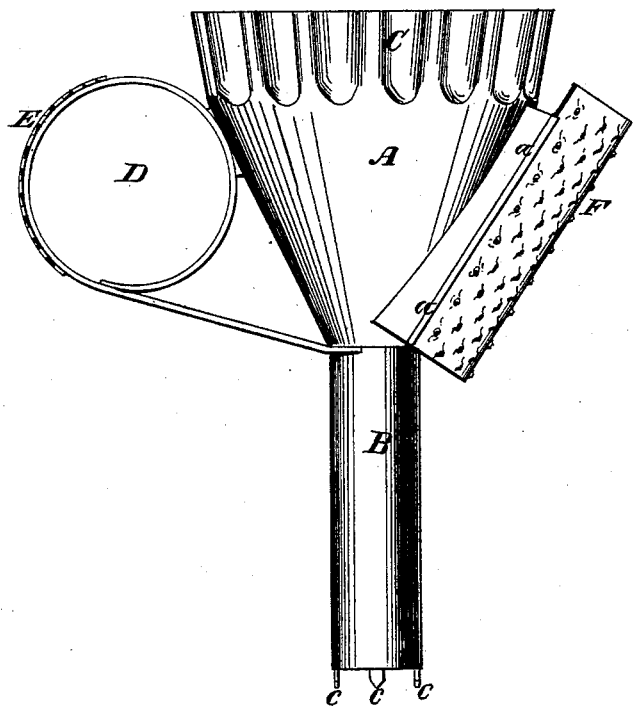

In the drawings, Figure 1 is a plan or top view of my combined device. Fig. 2 is a side elevation of the same.

A is a conical funnel, provided with the usual tube B. The upper edge of the funnel is corrugated or crimped to form a cake-cutter, C. The handle D is bent in the form of a circle of suitable diameter, and provided with a bent serrated plate, E, of steel preferably. This forms a device for cutting green-corn from the cob, the handle being made and attached stronger than usual, so as to stand the strain. The tube B is provided at the bottom with several points, c c—or the edge of the tube itself might be toothed, if made of material having sufficient strength. This forms a device for coring apples, pears, &c.

All of the above devices have been combined before in substantially the form shown, and I make no claim to them either collectively or individually, the description being incidental to that of my own combination, which I will now describe.

Secured to the inclined sides of the funnel A are grooved guides *a a* to receive the flanged edges of a grater, F. The grater fits snugly in the grooves, but may be removed for cleaning, if desired.

The manner of using the funnel and cake-cutter is obvious, and requires no explanation. When the corn-cutter is used the ring-shaped handle D is caused to embrace the ear, which stands on end, and on being pushed down the serrated plate E strips off the grains. The cutting-edge *c c* of the tube B is forced down through the fruit to be cored, at the same time being rotated, and the cores are cut out, forcing each other up through the tube and out at the top. When the grater F is used the funnel is inverted, and may rest on a solid support, when the grater will stand at the proper angle for use. As the tube B must be large enough to pass the cores of the fruit, it may be convenient to have a smaller conical tube to fit temporarily on the bottom when the funnel is used for filling small bottles, &c.

I prefer to construct the utensil, with the exception of the serrated plate E, wholly of tin-plate; but it may be made of any material.

I claim as my invention—

The combination of the funnel A and handle D with a removable grater, F, and the inclined guides *a a* affixed to the funnel in the manner shown and specified, and for the purposes set forth.

In witness whereof I have hereunto signed my name in the presence of two subscribing witnesses.

JOHN C. NOBLE.

Witnesses:
   HENRY CONNETT,
   FR. H. G. DE VEER.